June 21, 1955  C. E. HOLTKAMP  2,711,174
GLEANING ATTACHMENT FOR CORN CLEANERS
Filed Aug. 24, 1951  3 Sheets-Sheet 1

INVENTOR
CLARENCE E. HOLTKAMP

BY
McMorrow, Berman & Davidson
ATTORNEYS

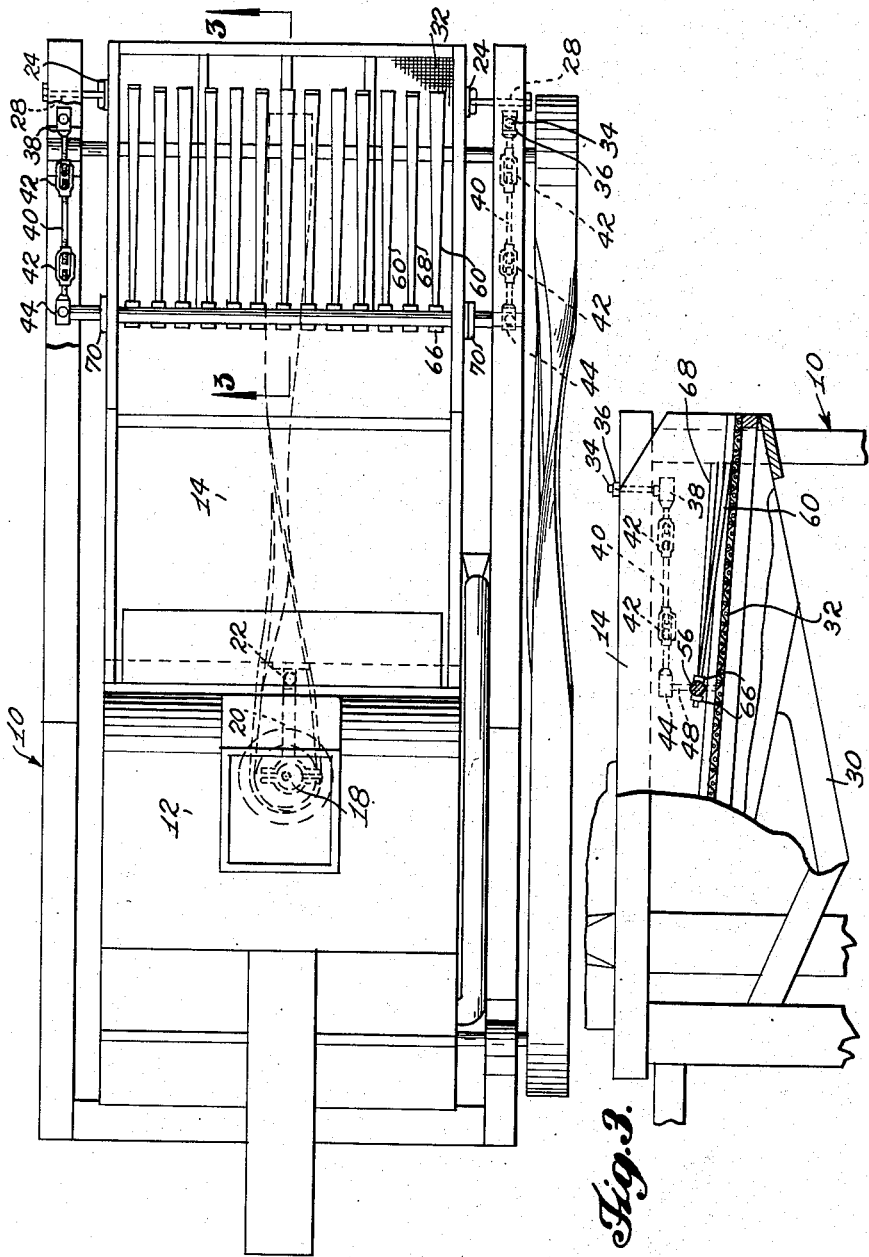

June 21, 1955  C. E. HOLTKAMP  2,711,174
GLEANING ATTACHMENT FOR CORN CLEANERS
Filed Aug. 24, 1951  3 Sheets-Sheet 3
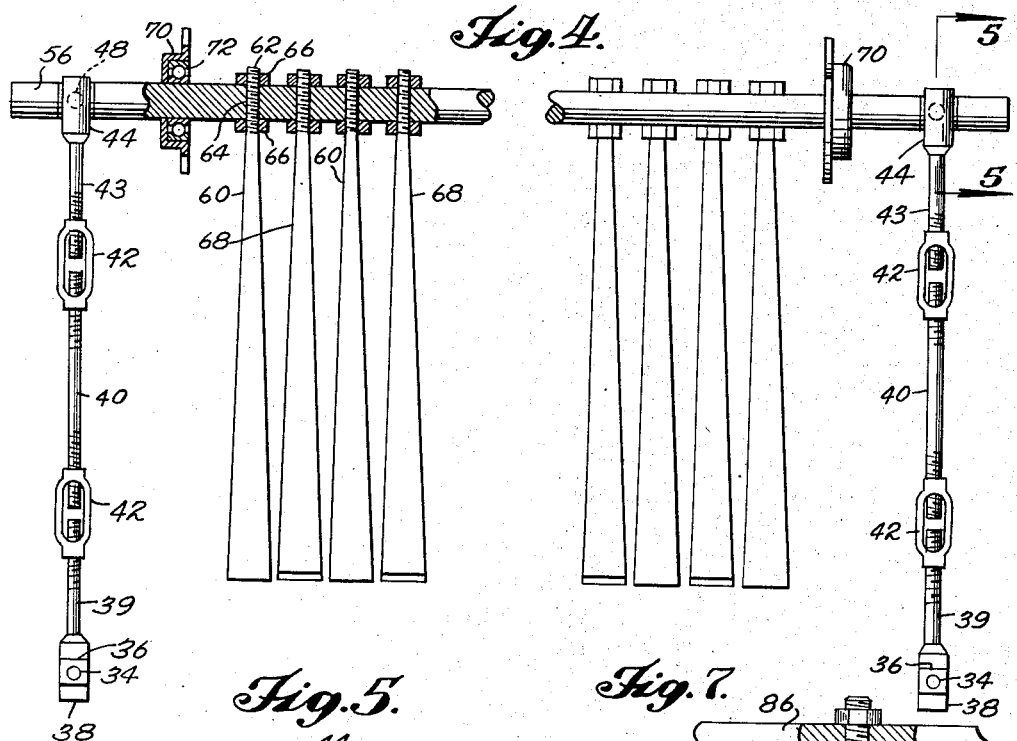
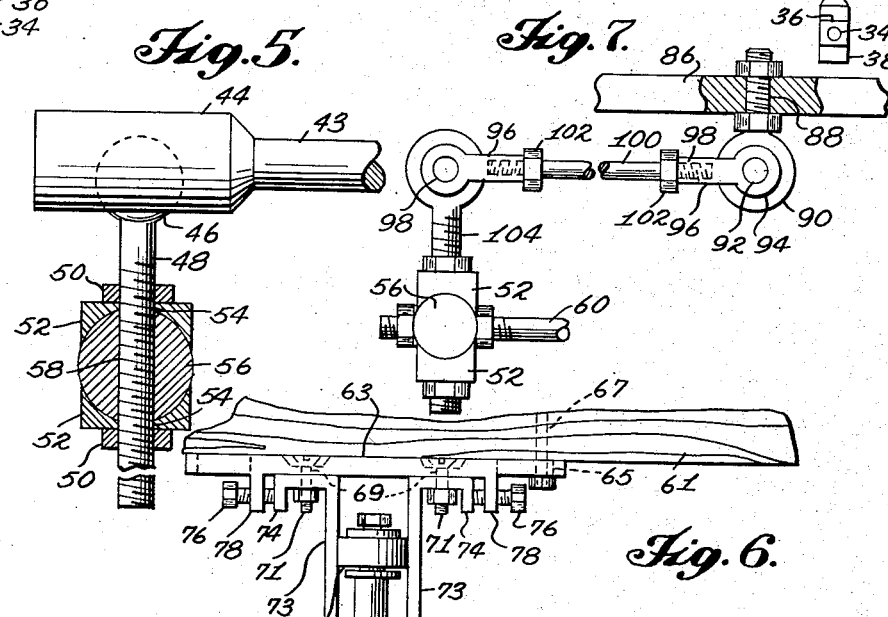
INVENTOR
CLARENCE E. HOLTKAMP
BY McMorrow, Berman & Davidson
ATTORNEYS

United States Patent Office 2,711,174
Patented June 21, 1955

2,711,174

GLEANING ATTACHMENT FOR CORN CLEANERS

Clarence E. Holtkamp, Benton, Ill., assignor to M. L. Campbell, Benton, Ill.

Application August 24, 1951, Serial No. 243,445

1 Claim. (Cl. 130—25)

This invention relates to an attachment mountable upon a corn cleaner, said attachment being adapted to supplement the conventional cleaning action of a corn cleaner, through the use of vibratory fingers effective to separate from the husks grains of corn that otherwise would be discharged with the husks as refuse.

Present-day corn cleaners are adapted for the separation of primarily shelled grains from the husks and cobs, after the whole corn has passed through a corn shelling mechanism.

Conventionally, the corn cleaner is provided with an oscillating shoe in which a screening device is embodied, the motion of said shoe being such as to effect the desired separation. The motion of the shoe, in this connection, causes the material to be separated to travel down a series of screens, and during the travel of said material along the screens, the grains are separated from the cobs and husks, which continue to one end of the shoe to be discharged as refuse.

The above described separation method was sufficient at the time of the construction of the corn cleaner as now constructed. However, since such time, harvesting methods have been improved, and mechanical corn pickers are widely used. These do not husk corn in the same manner as was previously done by hand, and the cleaner motion referred to above, as a result, does not operate upon the corn to be separated with the efficiency which was its characteristic at the time corn was manually husked. As a result, a substantial amount of the corn is discharged as refuse together with the cobs and husks, due to the fact that the use of mechanical corn pickers causes the grains of corn to become lodged in the husks.

The broad object of the present invention is to provide an attachment for a corn cleaner of the general type stated, novelly designed in a manner to dislodge grains of corn carried in the husks, which heretofore have been discharged as refuse, thus to supplement and increase the efficiency of operation of the conventional corn cleaning machine.

Another important object is to provide a device of the type stated which will be readily applicable to a corn cleaning machine of conventional construction, without modification of the structure to which the device is to be applied.

Still another important object is to provide a mechanism of the type stated which will be relatively inexpensive considering the benefits to be obtained from the use thereof, will be simple in construction, and will be ruggedly assembled.

Yet another important object is to provide a gleaning attachment so designed as to be easily modified for association with corn cleaning machines of different types.

Other objects will appear from the following description, the claim appended thereto and from the annexed drawings, in which like reference characters designate like parts throughout the several views, and wherein:

Figure 2 is a top plan view of the corn cleaning machine illustrated in Figure 1, and of my device;

Figure 3 is a fragmentary view of the corn cleaning machine, illustrated partly in side elevation, and partly in longitudinal section;

Figure 4 is an enlarged view, partly in section and partly in top plan, of the gleaning device alone, portions being broken away;

Figure 5 is a detail sectional view, still further enlarged, taken substantially on line 5—5 of Figure 4;

Figure 6 is a side elevational view of a modified form of the invention, the vibratory fingers thereof being illustrated fragmentarily; and Figure 7 is a view similar to Figure 6, and illustrating another modified form.

Figure 1:
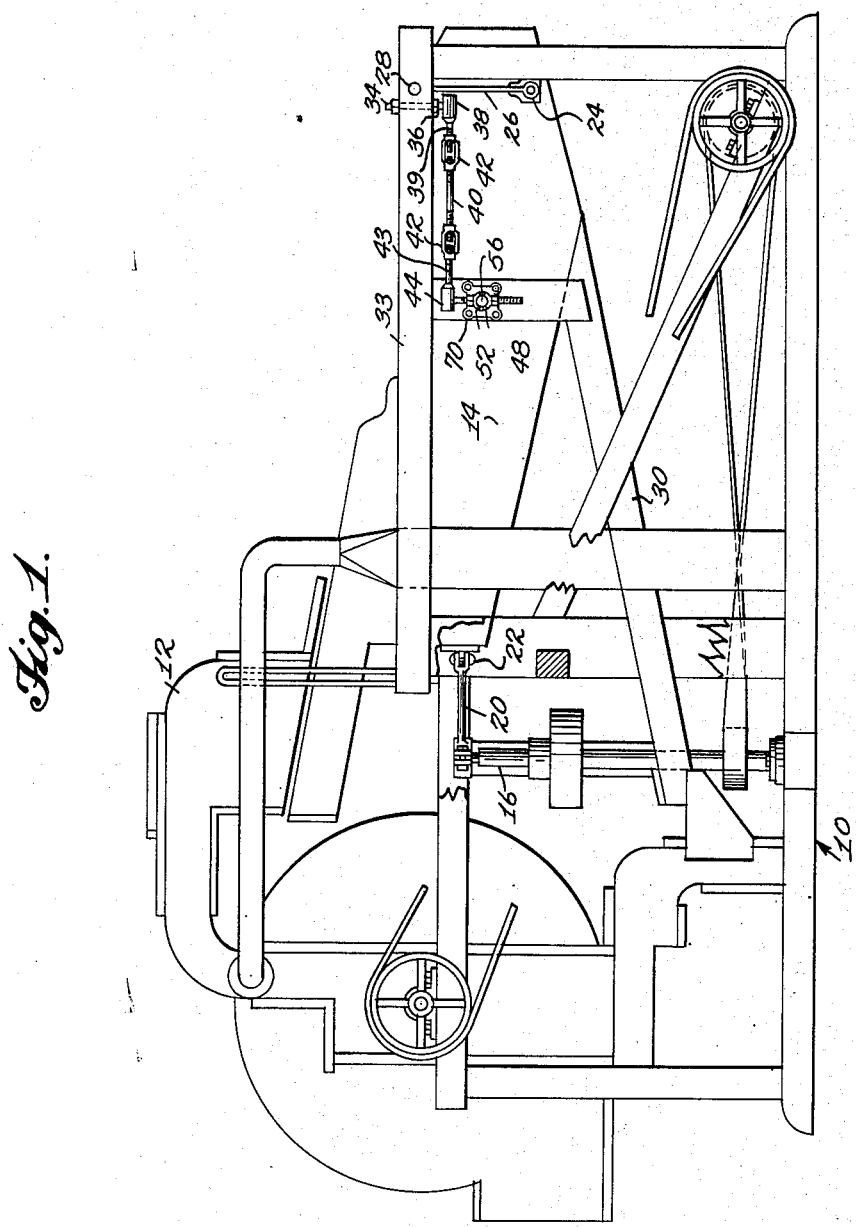
Figure 1 is a side elevational view of a typical corn cleaning machine and of a device formed in accordance with the present invention mounted in proper position upon said machine.

Referring to the drawings in detail, the reference numeral 10 designates generally a corn cleaning machine, having a hopper 12 from which material to be separated is discharged into an oscillating shoe 14.

For the purpose of imparting oscillating movement to the shoe 14, a shaft 16, powdered from any suitable source, is provided at its upper end with an eccentric 18, to which is connected one end of a pitman 20 having a pivotal connection 22 at its other end to the inner end of the oscillating shoe 14. The outer end of the oscillating shoe is pivotally connected, as at 24, to the lower end of a depending support rod 26, that is provided at its upper end with a lateral extension 28 journaled in the frame of the corn cleaning machine 10.

From the above, it may be noted that the oscillating shoe 14 is provided with a front-to-back swinging motion, as a result of which the material discharged thereinto is separated, the grains of corn passing into a discharge trough 30 and the cobs and husks being discharged as refuse from the right hand end of the machine as viewed in Figure 1. The material to be separated, as will be appreciated, passes over a series of screens 32 during the separation action.

Upon a corn cleaner such as that seen in Figure 1, I use the form of the invention illustrated in Figures 1–5. In this form of the device, means is provided for connecting the attachment at one end to a stationary portion of the corn cleaner, such as the fixed longitudinal frame member 33 thereof. A vertical opening is drilled through the frame member 33 adjacent the discharge end of the machine and extended through said opening is an upstanding stud 34. Nuts 36 are threaded upon the stud at opposite ends thereof, and are threadable against the top and bottom surfaces of the longitudinal frame member 33, so as to anchor the stud fixedly in a selected position of vertical adjustment relative to said frame member.

The lower end of the stud projects below the frame member 33, and is formed with a ball received in a ball socket 38. A threaded shank 39 is formed integrally with the ball socket, or is made rigid therewith in any suitable manner, and extends in parallelism with and below the frame member 33. The shank 39 is aligned coaxially with a link 40, and a turn buckle 42 is employed to connect the shank and link, said shank and link being oppositely threaded for adjustment of the link toward and away from the shank. Another turn buckle 42 is threaded upon the other end of the link 40, to connect to said other end of the link a shank 43 rigid with a ball socket 44. The ball receiving portion of the ball socket 44 opens downwardly, to receive a ball 46 formed upon the upper end of a depending, threaded connecting rod 48 provided with longitudinally spaced nuts 50.

The respective nuts 50 engage the outer faces of a pair of clamps 52 having arcuate inner faces, said clamps having aligned openings 44 through which the rod 48 extends. The rod extends through a smooth walled opening formed in the end portion of an elongated shaft 56, having the rod receiving opening 58.

The shaft 56 is mounted rotatably upon the shoe 14, extending transversely thereacross and having its end portions projecting beyond the opposite side walls of said shoe. The intermediate portion of the shaft, that extends through the shoe, is provided with a series of elongated agitating fingers, that are spaced longitudinally of said intermediate portion, and project radially from the shaft. Thus, a plurality of spring fingers 60 is provided, each finger having a threaded base 62 extending through a smooth walled opening 64 formed in the shaft 56, and locked to the shaft by means of nuts 66 threaded upon said base.

Intervening between the several fingers 60 are fingers 68. The fingers 68 are formed identically to the fingers 60, but are offset upwardly therefrom to a slight extent, as may be noted from Figure 3.

Both the fingers 60 and 68, in the present instance, are progressively widened toward their free ends, and are flattened for the greatest part of their lengths. However, at this point I believe it should be noted that the fingers might be of some other configuration, as for example, of circular cross section. Additionally, I believe it is possible that the fingers might all be disposed in a common plane, rather than in superposed planes as illustrated and described. These changes, it is thought, are sufficiently obvious as not to require special illustration.

To provide for rotatable mounting of the shaft 56 upon the shoe 14, I secure to the exterior surfaces of the respective side walls of the shoe bearing retainers 70, each of which is provided with a ball bearing 72 (Figure 4).

In the forms of the invention illustrated in Figures 6 and 7, the shaft 56 is mounted rotatably upon the side walls of the shoe, and interiorly of the shoe, is provided with fingers 60, 68, the construction in this respect being identical to that of the first form of the invention. However, in said modified forms of the invention, a different linkage is employed whereby the shaft is connected to a stationary part of the corn cleaner frame. For example, in Figure 6 the corn cleaner frame member 61 is provided with a mounting plate 63, which is positioned against the under side of the frame member. The plate 63, at opposite ends thereof, has longitudinal slots 65, through which extend connecting bolts 67, passing through suitable openings formed in the frame member 61. Through the provision of the elongated slots 65, the plate 63 is adjustable longitudinally of the frame member, and can be secured in selected positions of longitudinal adjustment.

Formed in the plate 63, inwardly of the slots 65, are other longitudinal slots 69, through which extend countersunk machine screws 71. The screws 71 serve to connect to the under side of the plate 63 a pair of spaced, oppositely arranged brackets 73 of inverted L-shape, said brackets having openings registrable with the slots 69 for passage therethrough of the screws 71. Nuts are employed to secure the brackets 73 in selected positions of longitudinal adjustment relative to the plate 63.

Formed upon the upper ends of the brackets 73 are depending ears 74 engageable by adjusting screws 76, that are threaded through depending wings 78 formed upon the plate 63, at locations spaced inwardly from the opposite ends of said plate. Through the provision of the set screws 76, the brackets 73 can be selectively adjusted longitudinally of the plate 63, to engage diametrically opposite locations upon a collar 80 rotatably mounted upon the reduced upper end of a connecting rod 82 threaded at its lower end to receive lock nuts 84, that engage clamps 52 similar to those clamps illustrated and described in connection with the first form of the invention. The clamps 52 in the form of Figure 6, as will be understood, engage opposite portions of a shaft 56 having fingers 60, 68.

In the form of the invention illustrated in Figure 7, a frame member 86 is provided with an opening through which extends a threaded shank 88, that is secured to the frame member 86 by suitable lock nuts, the shank 88 being integrally formed with an eye 90, receiving a connecting pin 92, that extends through an eye 94 having a shank 96, the free end of which is formed with a threaded socket 98.

Threaded into the socket 98 is one end of a connecting link 100, and lock nuts 102 secure the connecting rod in selected positions of longitudinal adjustment relative to the shank 96.

The opposite end of the rod 100 is also threaded, and is received in the threaded socket of a shank formed identically to the shank 96, the second named shank also being provided with an eye. A connecting pin extends through said eye, and through the eye of a threaded member 104 carrying clamp members 52 engageable against diametrically opposite portions of the shaft 56.

Considering first the operation of the form of the invention illustrated in Figures 1–5, the shoe 14 of the corn cleaning machine is one having two motions. The first of these is an oscillating motion longitudinally of the machine, which may be conveniently termed a front-to-back oscillative movement. The second of these motions is a side-to-side motion.

When the shoe 14 is given its compound motion, it will carry with it the shaft 56. The front-to-back oscillative movement, in this connection, has the effect of rotating the shaft partially in opposite directions, due to the linkage of said shaft with a stationary portion of the machine. At the same time, the universal connections which said shaft has with the stationary frame member of the machine permits the shaft to move from side to side of the machine with the oscillating shoe.

The very rapid rotatable movement of the shaft in opposite directions imparts a vibratory action to the free ends of the fingers 60, 68. The fingers, being disposed for gravitation of the husks and grains thereto, give a dancing movement to the material gravitating therethrough, which has the effect of dislodging grains of corn carried within the husks, so as to permit said grains to drop to the screens 32. The husks, meanwhile, traverse the fingers longitudinally thereof, and are then discharged to the screens for passage from the oscillating shoe.

In the form of the invention illustrated in Figure 6, the collar 80 has up and down movement between the brackets 73, to allow for up and down motion of the shaft 56 during the oscillating movement of the shoe from front to back of the corn cleaning machine. The collar 80 also has movement transversely of the brackets 73, to permit the side-to-side motion of the oscillating shoe. The adjustments illustrated, which are permitted by reason of the slots 65, 69, permit the fingers to be raised or lowered as desired, and are also effective to obtain operation of the fingers in a short or long motion, as desired.

In the form of the invention illustrated in Figure 7, the device is usable with corn cleaning machines in which there is only a front-to-back oscillatable movement of the shoe. Thus, simple pivotal connections are permitted, rather than universal joints, said pivotal connections being allowable in view of the fact that there is no side-to-side movement of the oscillating shoe.

In all forms of the invention, the characteristic is present whereby the shaft 56 has partial rotatable movement in opposite directions, relative to the shoe 14 on which it is mounted, this being provided for first by rotatable mounting of the shaft 56 in the side walls of the shoe 14, and second by providing a linkage directly between the shaft and a stationary portion of the corn cleaning machine. As a result, vibratory movement of the fingers 60, 68 obtains in each instance, said movement having the effect of vibrating the husks at high speed, during passage of the husks longitudinally of said fingers 60, 68.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

In a device for gleaning grains of corn from refuse material in which grains are lodged, the combination, with the oscillating shoe and stationary frame of a corn gleaning structure, of a shaft mounted for rotation upon said shoe and arranged transversely of the shoe; spring fingers rigidly connected at one end to and projecting radially from the shaft longitudinally of the shoe, said fingers being disposed for gravitation thereto of refuse material to be gleaned and being adapted for high-speed vibratory movement to effect separation of said grains from the refuse material; and a linkage between the shaft and stationary frame operative to effect rocking movement of the shaft in opposite directions responsive to the oscillative action of said shoe so as to impart vibratory motion to the fingers, said linkage including a shank fixed at one end to the shaft, and means supported by the stationary frame extending into engagement with the other end of the shank and holding the other end of the shank against movement in the direction of oscillation of the shaft and shoe, said means comprising a plate secured to said frame, spaced brackets connected to and depending from the plate, and a collar rotatably carried adjacent the other end of said shank remote from the shaft and disposed between the brackets, said collar having up and down and side to side movement within the brackets, and said brackets engaging said collar at diametrically opposed locations thereon.

References Cited in the file of this patent

UNITED STATES PATENTS

| Number | Name | Date |
|---|---|---|
| 14,517 | Cox | Mar. 25, 1856 |
| 16,103 | Lyndall | Nov. 18, 1856 |
| 125,513 | Allonas | Apr. 9, 1872 |
| 221,463 | Horn | Nov. 11, 1879 |
| 224,850 | Sheldon | Feb. 24, 1880 |
| 284,675 | Rumely | Sept. 11, 1883 |
| 543,768 | Haag | July 30, 1895 |
| 1,461,144 | Hanneman | July 10, 1923 |